March 8, 1927. 1,620,563

E. M. MAYER

CHILD'S VEHICLE

Filed Oct. 3, 1925

Inventor
Emil M. Mayer,
By Murray & Gugelter
Attorneys.

Patented Mar. 8, 1927.

1,620,563

UNITED STATES PATENT OFFICE.

EMIL M. MAYER, OF CINCINNATI, OHIO.

CHILD'S VEHICLE.

Application filed October 3, 1925. Serial No. 60,354.

An object of my invention is to provide a child's vehicle having a simple, efficient and inexpensive steering mechanism.

Another object is to provide a vehicle of this kind which is stable and which cannot be overturned when being propelled by a child's foot.

Another object is to provide a vehicle of this type which cannot be overbalanced, regardless of the position of the front wheel.

These and other objects are attained by the means described herein and disclosed in the accompanying drawings, in which.

Figure 1:
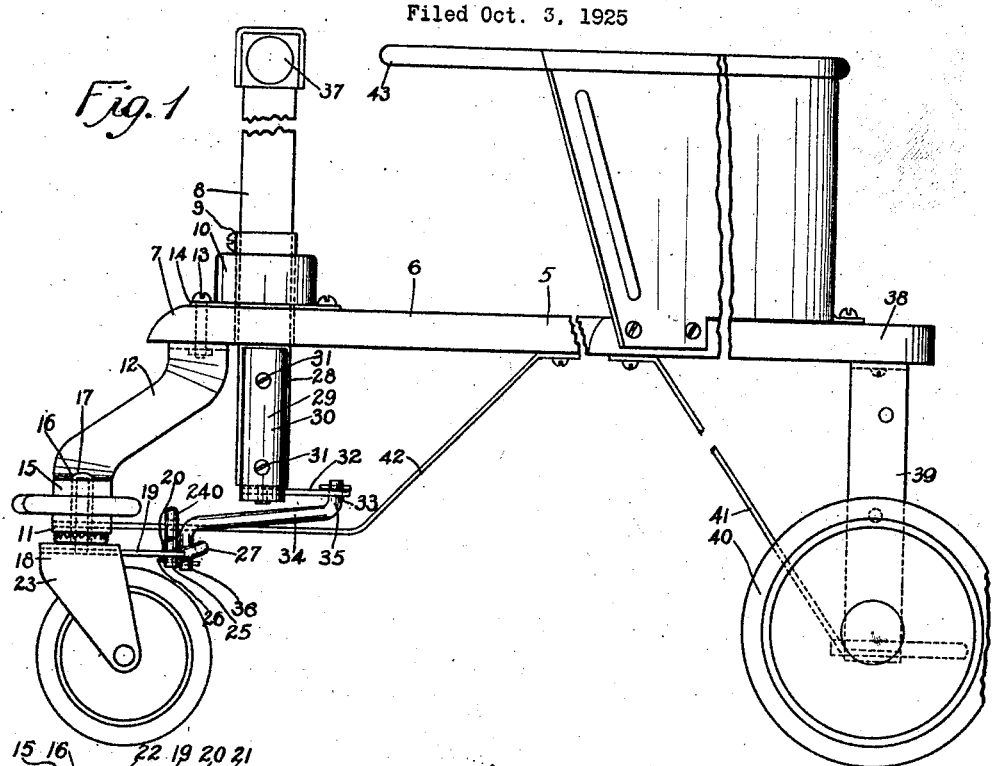
Fig. 1 is a fragmental side elevation of a vehicle of my invention.
Figure 2:
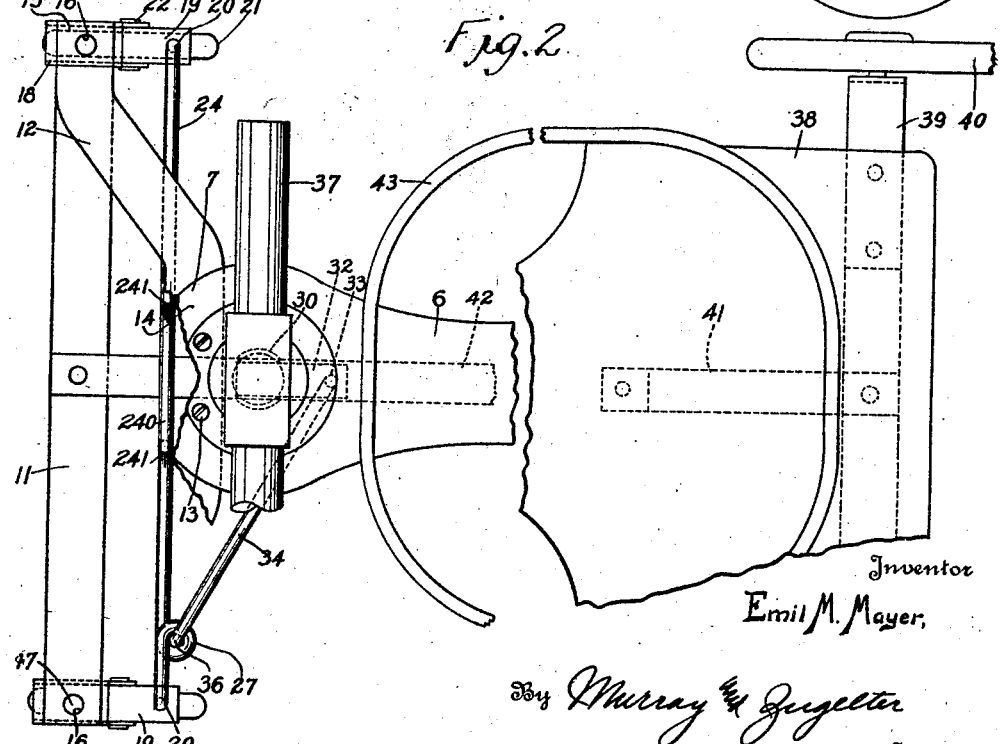
Fig. 2 is a plan view of the device, parts being broken away.

The vehicle of my invention comprises a saddle member 5, the forward portion of which is cut away as at 6 to provide suitable clearance for the child's limbs in propelling the vehicle. The forward portion 7 of the saddle 5 has a steering post 8 journaled therein by any suitable means such as a sleeve 9 on the post 8 supported in a perforate cup member 10 which is secured to the end 7 of the saddle. A cross bar 11 is rigidly supported below and is disposed forwardly of the front end 7 of the saddle. This disposition of the cross bar 11 is essential to the stability of the vehicle, and is especially adapted to preclude the vehicle tipping over forwardly as well as sidewardly. The cross bar 11 is preferably provided with upwardly and rearwardly converging arms 12 which are secured at the front end 7 of the saddle by any suitable means such as bolts 13 which may conveniently pass through the flange 14 of the cup 10, thereby eliminating the necessity for additional washers and screws. In the present embodiment, the cross bar 11 and arms 12 are integrally formed from a flat bar of iron or steel so that the cross bar may carry U-shaped portions 15 at its opposite ends. The U-shaped portions 15 are provided with vertically aligned perforations 16 for receiving a stem 17 of a front wheel bracket 18. Each of the front wheel brackets 18 carries a rearwardly extending lug 19 provided with a perforation 20. Wheels or rollers 21 are revolubly supported on a suitable individual axle 22 carried by the arms 23 of the wheel brackets 18. A tie-rod 24 is provided with downwardly turned ends 25 which extend through the perforations 20 in the lugs 19 and are secured against separation therefrom by any suitable means such as cotter pins 26. From the foregoing it will be apparent that the wheels 21 are always disposed at a given position with relation to the saddle 5 and that they may be retained in parallel relation one to the other by making the tie-rod 24 of a proper length. The tie-rod 24 is provided with an eye portion 27 conveniently formed by bending the rod 24 upon itself. The portion 28 of the steering rod 8 is disposed beneath the top end of the saddle and is provided with a U-shaped clip 29, the arms 30 of which are secured to the portion 28 of the steering post by means of rivets or screws 31. The clip 29 carries a rigid arm 32 having a perforation 33 at the free end thereof. A link 34 has a turned end 35 extending through the perforation 33 in arm 32 and its opposite end 36 extending through the eye 27 in tie-rod 24. The steering rod may be provided with a wheel or a handle member 37 in order to turn it. The rear end 38 of the saddle 5 carries a suitable cross member 39 upon which the rear wheels 40 may be mounted. Suitable braces 41 and 42 serve to support the member 39 and cross bar 11 in a well known manner and impart greater rigidity to the structure. In order to preclude turning steering rod through a complete revolution, the tie rod 24 is provided with an inverted U-shaped bend 240, the arms 241 of which lie on opposite sides of the horizontal portion of brace 42. Any suitable body support such as a ring member 43 may be provided in order to prevent a child from falling from the saddle 5.

From the foregoing it will be apparent that the saddle 5 is at all times sustained at four points and that the steering post and its handle are disposed well within the limits of these four points so that the child may dispose his weight upon either side of the handle 37 without being able to tip over the vehicle while the mounting of the front wheels 21 will enable a child to steer the vehicle.

What I claim is:

1. In a child's vehicle the combination with a saddle, of a steering post journaled in the forward end of the saddle, a cross bar carried by said end of the saddle and disposed forwardly thereof, wheel brackets journaled at opposite ends of the cross bar, perforate lugs on the brackets, a tie-rod having its opposite ends extending through the perforations in the lugs, an arm carried by the steering post, and a link connecting the arm and the tie-rod.

2. In a device of the class described the combination with a saddle, means for supporting the rear end of the saddle, a cross bar having upwardly and rearwardly converging arms, the ends of said arms being secured to the forward end of the saddle, a wheel bracket pivotally mounted at each end of the cross bar, wheels carried by the wheel brackets, a tie-rod connecting the wheel brackets, a steering post journaled in the saddle adjacent the forward end thereof, an arm extending transversely of the steering rod and disposed beneath the saddle, and a link having its opposite ends pivoted on the arm and tie-rod.

3. In a device of the class described the combination with a saddle, wheels revolubly mounted beneath the rear end of the saddle, a cross bar having integral arms extending rearwardly therefrom, the said arms being secured to the forward end of the saddle, pivotally mounted wheel brackets disposed at the ends of the cross bar and movable independently of one another, and means comprising a connecting link and a tie-rod for effecting co-ordinate movement of the wheel brackets.

4. In a steering mechanism for a toy vehicle the combination with a rotatably mounted steering post, a U-shaped clip carried by an end of the steering post, an arm rigidly secured to the clip, a pair of pivotally mounted wheel brackets, lugs on the brackets, a tie-rod pivotally connected at its opposite ends to said lugs, and a link pivotally mounted at its one end to the arm and at its opposite end to the tie-rod adjacent one of the wheel brackets.

5. In a steering mechanism for toy vehicles the combination with a pair of wheel brackets having perforate lugs extending therefrom, a tie-rod turned upon itself adjacent one of its ends to form an eye, angularly disposed portions formed at the end of the rod and extending through the perforations in the lugs for connecting the wheel brackets, and a link having a turned end extending through the eye in the tie-rod whereby movement of the link will effect coordinate pivotal movement of the wheel brackets.

6. In a toy vehicle the combination of a body, a rotatably mounted steering post, a bracket on the body extending beneath the end of the steering post, a rigid arm secured to the end of the steering post and disposed above the bracket, pivotally mounted wheel brackets for supporting the forward end of the body, a tie-rod having an inverted U-shaped bend therein adapted to straddle the first mentioned bracket, said tie-rod being connected at its opposite ends to the wheel brackets and a link connecting the rigid arm and tie-rod, the U-shaped bend in the tie-rod serving to limit the movement of the tie-rod whereby the wheel brackets are precluded from being completely revolved about their pivotal mountings when the steering post is turned.

In testimony whereof, I have hereunto subscribed my name this 24th day of September, 1925.

EMIL M. MAYER.